(12) United States Patent
Pan et al.

(10) Patent No.: US 8,497,849 B2
(45) Date of Patent: Jul. 30, 2013

(54) TOUCH MODULE OUTPUTTING SENSED DATA ARRAY

(75) Inventors: Wen-Chieh Pan, New Taipei (TW); Ar-Jann Lin, Zhongli (TW)

(73) Assignee: Yen-Hung Tu, Taipei (TW)

( * ) Notice: Subject to any disclaimer, the term of this patent is extended or adjusted under 35 U.S.C. 154(b) by 222 days.

(21) Appl. No.: 13/183,357

(22) Filed: Jul. 14, 2011

(65) Prior Publication Data

US 2012/0327015 A1   Dec. 27, 2012

(30) Foreign Application Priority Data

Jun. 22, 2011   (TW) .............................. 100121753 A

(51) Int. Cl.
*G06F 3/045* (2006.01)
(52) U.S. Cl.
USPC ........................................................ 345/174
(58) Field of Classification Search
USPC ........................................ 345/174, 173, 176
See application file for complete search history.

(56) References Cited

U.S. PATENT DOCUMENTS

| | | | |
|---|---|---|---|
| 6,040,868 A * | 3/2000 | Jun ............................... | 348/448 |
| 6,403,941 B1 * | 6/2002 | Crane ......................... | 250/208.1 |
| 2010/0277420 A1 * | 11/2010 | Charlier et al. ................ | 345/173 |
| 2010/0277439 A1 * | 11/2010 | Charlier et al. ................ | 345/176 |
| 2011/0141052 A1 * | 6/2011 | Bernstein et al. ............. | 345/174 |

* cited by examiner

*Primary Examiner* — Fred Tzeng
(74) *Attorney, Agent, or Firm* — Shimokaji & Associates P.C.

(57) ABSTRACT

A touch module outputting sensed data array, the touch module including a sensor array, and a sensed data array generator, the sensed data array generator including: a multiplexer, used to select one line from a plurality of scan output lines of the sensor array for delivering an analog sensed output signal, wherein the analog sensed output signal carries sensed array information of the sensor array; an analog to digital converter, used for converting the analog sensed output signal to a first digital signal, to provide a first sensed data array corresponding to the sensed array information; a memory, used for storing the first sensed data array; and an output control unit, used for transforming the first sensed data array to a second sensed data array.

14 Claims, 3 Drawing Sheets

TOUCH MODULE OUTPUTTING SENSED DATA ARRAY

BACKGROUND OF THE INVENTION

1. Field of the Invention

The present invention relates to a touch module, especially to a touch module outputting sensed data array.

2. Description of the Related Art

Please refer to FIG. 1, which illustrates a block diagram of a prior art touch module 100 interfacing with a central processing unit 170. As illustrated in FIG. 1, the prior art touch module 100 includes a sensor array 110, a multiplexer 120, an analog to digital converter 130, a micro controller/digital signal processor 140, a program memory 150, and a data memory 160.

The sensor array 110 has a plurality of scan output lines Y, and is commonly implemented with a resistive sensor array or a capacitive sensor array.

The multiplexer 120 is used for selecting one line from the scan output lines Y to deliver an analog sensed output signal $S_A$.

The analog to digital converter 130 is used for converting the analog sensed output signal $S_A$ to a digital sensed signal $D_1$.

The micro controller/digital signal processor 140 is used for executing a firmware program to perform calculations of touch coordinates and gesture codes according to the digital sensed signal $D_1$, and communicate with the central processing unit 170 via a communication control signal C, so as to transmit data of the touch coordinates and the gesture codes to the central processing unit 170 through a data output signal $D_{OUT}$.

The firmware program generally has procedures including scanning the sensor array 110 sequentially (step a), calculating touch coordinates and gesture codes (step b), delivering an interrupt request (step c), and outputting data of the touch coordinates and the gesture codes (step d), wherein, the interrupt request is delivered via the communication control signal C.

The memory 150 is used for storing the firmware program, while the data memory 160 is used for storing data needed during calculation processes.

According to the operations mentioned above, the touch module 100 can therefore provide data of touch coordinates and gesture codes to the central processing unit 170.

However, the architecture of the prior art touch module 100 has some disadvantages:

1. The demand of memory space for the program memory 150 and the data memory 160 will increase accordingly when the number of touch points increases, or the number of detecting points increases, or the number of varieties of gesture increases, or a function for noise depression is opened, or the size of the firmware program increases.

2. The capability of the firmware program is limited to the performance of the micro controller/digital signal processor 140 and the storage space of the program memory 150 and the data memory 160.

3. The demand of operation speed on the micro controller/digital signal processor 140 will increase accordingly when the number of touch points increases, or the number of detecting points increases, or the number of varieties of gesture increases, or the size of the sensor array 110 increases.

4. The manufacture cost of the touch module 100 will increase accordingly when the number of touch points increases, or the number of detecting points increases, or the number of varieties of gesture increases, or the size of the sensor array 110 increases.

5. The performance of the touch module 100 is limited by the performance of the micro controller/digital signal processor 140.

To solve the foregoing disadvantages, the present invention proposes a novel touch module, which is capable of outputting sensed data array.

SUMMARY OF THE INVENTION

One objective of the present invention is to disclose a touch module outputting sensed data array, so as to get rid of program memory.

Another objective of the present invention is to disclose a touch module outputting sensed data array, so as to reduce the space requirement of data memory.

Still another objective of the present invention is to disclose a touch module outputting sensed data array, so that the functions of the touch module can be implemented by a simple state machine.

Still another objective of the present invention is to disclose a touch module outputting sensed data array, so as to reduce manufacture cost.

Still another objective of the present invention is to disclose a touch module outputting sensed data array, so as to transfer the calculations of touch coordinates and gesture codes from the touch module to an external central processing unit, to make use of the powerful capability of the central processing unit, and in the meantime simplify the architecture of the touch module.

To attain the foregoing objectives, a touch module outputting sensed data array is proposed, the touch module including a sensor array, and a sensed data array generator, the sensed data array generator including: a multiplexer, an analog to digital converter, a memory, and an output control unit.

In the module, the multiplexer is used to select one line from a plurality of scan output lines of the sensor array for delivering an analog sensed output signal, wherein the analog sensed output signal carries sensed array information of the sensor array.

The analog to digital converter is used for converting the analog sensed output signal to a first digital signal, to provide a first sensed data array corresponding to the sensed array information.

The memory is used for storing the first sensed data array via the first digital signal.

The output control unit is used for performing a coding operation on the first sensed data array to generate a second sensed data array, and outputting the second sensed data array via a second digital signal.

Preferably, the sensor array is one selected from the group consisting of patterned copper foil sensor array, resistive sensor array, capacitive sensor array, force sensor array, electromagnetic sensor array, infrared sensor array, microwave sensor array, and acoustic wave sensor array.

Preferably, the sensed data array generator further includes a variable matrix scan control unit for controlling the multiplexer, the analog to digital converter, and the memory, wherein the variable matrix scan control unit has a standby mode and a variable matrix scan mode.

Preferably, the output control unit has an output interface for outputting the second digital signal.

Preferably, the output control unit further includes an encoder, for performing the coding operation.

Preferably, the coding operation includes a data allocation.

Preferably, the coding operation further includes a process of setting a data transmission format.

Preferably, the transmission data format is one selected from the group consisting of line oriented data format, plane oriented data format, universal communication protocol based data formats, standard image data formats, and custom-made data formats.

Preferably, the output control unit further includes a communication interface, for outputting an interrupt request to a central processing unit.

To attain the foregoing objectives, another touch module outputting sensed data array is proposed, the touch module including a sensor array, and a sensed data array generator, the sensed data array generator including: a multiplexer, an analog to digital converter, a memory, a variable matrix scan control unit, and an output control unit.

In the module, the multiplexer is used to select one line from a plurality of scan output lines of the sensor array for delivering an analog sensed output signal, wherein the analog sensed output signal carries sensed array information of the sensor array.

The analog to digital converter is used for converting the analog sensed output signal to a first digital signal, to provide a first sensed data array corresponding to the sensed array information.

The memory is used for storing the first sensed data array via the first digital signal.

The variable matrix scan control unit is used for controlling the multiplexer, the analog to digital converter, and the memory, wherein the variable matrix scan control unit has a standby mode and a variable matrix scan mode.

The output control unit is used for performing a coding operation on the first sensed data array to generate a second sensed data array, and outputting the second sensed data array via a second digital signal.

Preferably, the sensor array is one selected from the group consisting of patterned copper foil sensor array, resistive sensor array, capacitive sensor array, force sensor array, electromagnetic sensor array, infrared sensor array, microwave sensor array, and acoustic wave sensor array.

Preferably, the output control unit has an output interface for outputting the second digital signal.

Preferably, the output control unit further includes an encoder, for performing the coding operation.

Preferably, the coding operation includes a data allocation.

Preferably, the coding operation further includes a process of setting a data transmission format.

Preferably, the transmission data format is one selected from the group consisting of line oriented data format, plane oriented data format, universal communication protocol based data formats, standard image data formats, and custom-made data formats.

Still preferably, the output control unit further includes a communication interface, for outputting an interrupt request to a central processing unit.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
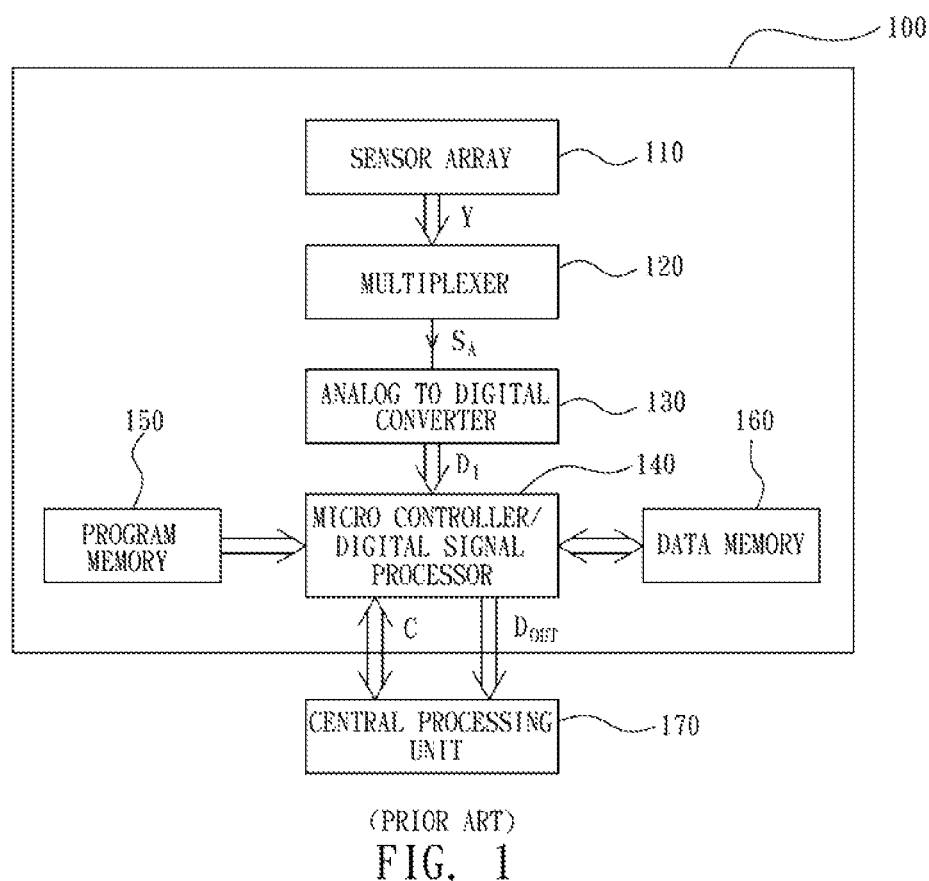
FIG. 1 illustrates a block diagram of a prior art touch module interfacing with a central processing unit.
Figure 2:
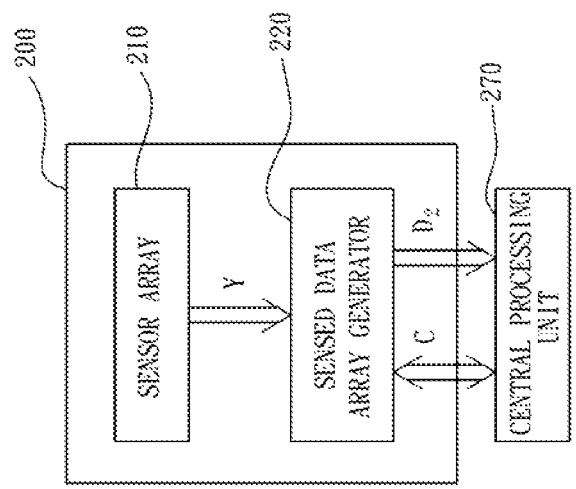
FIG. 2 illustrates a block diagram of a touch module outputting sensed data array to a central processing unit according to a preferred embodiment of the present invention.

Please refer to FIG. 2, which illustrates a block diagram of a touch module 200 outputting sensed data array to a central processing unit 270 according to a preferred embodiment of the present invention. As illustrated in FIG. 2, the touch module 200 has a sensor array 210 and a sensed data array generator 220.

The sensor array 210, having a plurality of scan output lines Y, can be a patterned copper foil sensor array, a resistive sensor array, a capacitive sensor array, a force sensor array, an electromagnetic sensor array, an infrared sensor array, a microwave sensor array, or an acoustic wave sensor array, used for generating analog sensed signals in response to touch events.

The sensed data array generator 220 is used for executing the following steps: selecting one line from the scan output lines Y of the sensor array 210 for delivering an analog sensed output signal, wherein the analog sensed output signal carries sensed array information of the sensor array (step a); converting the analog sensed output signal to a first digital signal, to provide a first sensed data array corresponding to the sensed array information (step b); storing the first sensed data array via the first digital signal (step c); and performing a coding operation on the first sensed data array to generate a second sensed data array, and outputting the second sensed data array via the second digital signal $D_2$ (step d).

In step a, the sensed data array generator 220 can operate in a variable matrix scan mode to scan the sensor array 210. The variable matrix scan mode is capable of switching scan resolutions to speed up scan process, reduce memory requirement, and save power by entering a standby state.

The variable matrix scan mode can first detect a touch event X by using a 1×1 scan resolution as illustrated in Table 1 below.

TABLE 1

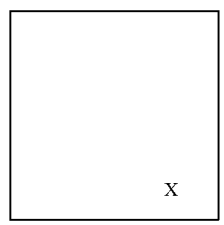

After the touch event X detected, the variable matrix scan mode proceeds to locate the touch event X by using a 2×2 scan resolution as illustrated in Table 2 below.

TABLE 2

|  |  |
|---|---|
|  |  |
|  | X |

After locating the touch event X as taking place in the right-bottom region of table 2, the variable matrix scan mode then scan the right-bottom region with a 2×2 scan resolution as illustrated in Table 3 below.

TABLE 3

|  |  |  |
|---|---|---|
|  |  |  |
|  |  |  |
|  |  | X |
|  |  |  |

Based on the specification above, the variable matrix scan mode not only can speed up scan process and reduce memory requirement, but also can save power consumption of the touch module.

In step d, the coding operation can include a data allocation and a process of setting a data transmission format. The data transmission format can be a line oriented data format, a plane oriented data format, universal communication protocol based data formats, standard image data formats, or custom-made data formats, wherein the universal communication protocol based data format can be NetBEUI (NetBIOS Extended User Interface), TCP/IP (Transmission Control Protocol/Internet Protocol), or IPX (Internetwork Packet Exchange); while the standard image data format can be BMP (Bit Mapped), GIF (Graphics Interchange Format), TIF (Tagged Image File), or JPG (Joint Photographic Experts Group).

Besides, the sensed data array generator 220 utilizes a communication signal C to send an interrupt request to the central processing unit 270, so as to transmit the second sensed data array to the central processing unit 270 via the second digital signal $D_2$.

The central processing unit 270, after receiving an interrupt request from the sensed data array generator 220 via the communication signal C, will fetch the second sensed data array via the second digital signal $D_2$, and then make use of powerful software and/or hardware resources—for example, a GPU (Graphics Processing Unit)—it possesses to perform a data processing on the second sensed data array. The data processing may include a noise elimination process and a decoding process, so as to facilitate the calculations of touch coordinates and gesture codes.

That is, by installing the sensed data array generator 220 of the present invention in the touch module 200, the calculations of touch coordinates and gesture codes can be transferred from the touch module 200 to the central processing unit 270, and the operation procedures and workload of the touch module 200 can therefore be greatly reduced. As the operation procedures and workload of the touch module 200 can be greatly reduced, the function of the touch module 200 can therefore be implemented with a simple state machine. In addition, the variable matrix scan mode also has the advantages of speeding up scan process, reducing memory requirement, and saving power consumption.

Figure 3:
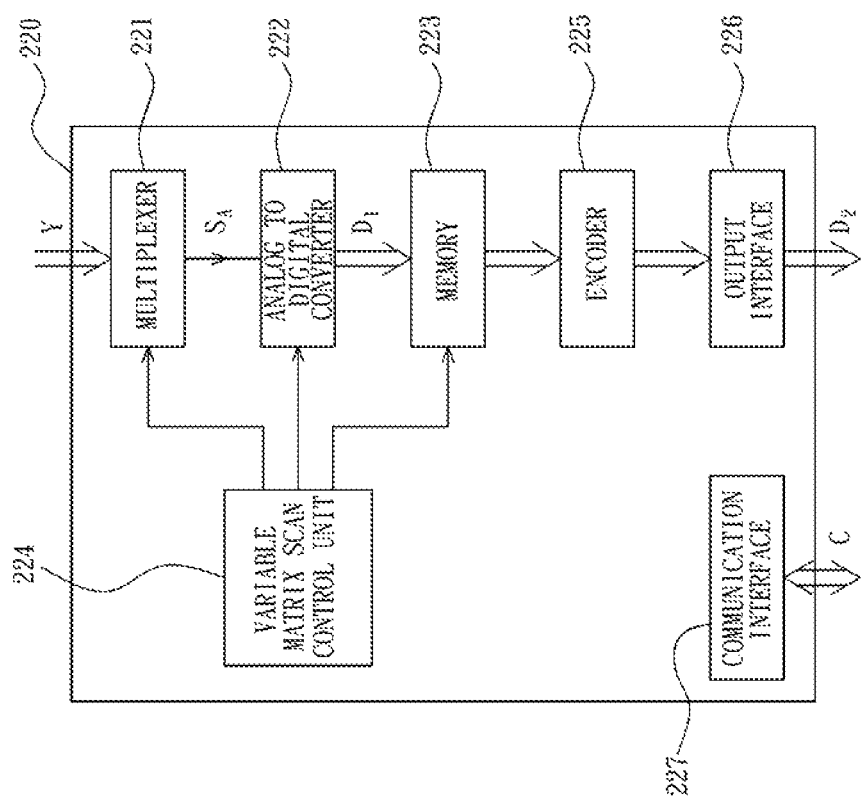
FIG. 3 illustrates a block diagram of a preferred embodiment of the sensed data array generator of FIG. 2.

According to the foregoing specification, the present invention proposes a preferred embodiment of the sensed data array generator 220, of which the block diagram is illustrated in FIG. 3. As illustrated in FIG. 3, the preferred embodiment includes a multiplexer 221, an analog to digital converter 222, a memory 223, a variable matrix scan control unit 224, an encoder 225, an output interface 226, and a communication interface 227.

The multiplexer 221 is used for selecting one line from the scan output lines Y of the sensor array 210 for delivering an analog sensed output signal $S_A$, wherein the analog sensed output signal $S_A$ carries sensed array information of the sensor array 210.

The analog to digital converter 222 is used for converting the analog sensed output signal $S_A$ to a first digital signal $D_1$, to provide a first sensed data array corresponding to the sensed array information.

The memory 223 is used for storing the first sensed data array via the first digital signal $D_1$.

The variable matrix scan control unit 224 is used for controlling the multiplexer 221, the analog to digital converter 222, and the memory 223, wherein the variable matrix scan control unit 224 has a standby mode and a variable matrix scan mode. As the variable matrix scan mode has been elaborated in the specification of FIG. 2, it will not be readdressed here.

The encoder 225, output interface 226, and communication interface 227 are used for forming an output control unit to perform a coding operation on the first sensed data array, so as to generate a second sensed data array; and, under the control of the communication signal C, output the second sensed data array via the second digital signal $D_2$.

The encoder 225 is used for performing the coding operation, which includes a data allocation and a process of setting a data transmission format. The data transmission format can be a line oriented data format, a plane oriented data format, universal communication protocol based data formats, standard image data formats, or custom-made data formats, wherein the universal communication protocol based data format can be NetBEUI (NetBIOS Extended User Interface), TCP/IP (Transmission Control Protocol/Internet Protocol), or IPX (Internetwork Packet Exchange); while the standard image data format can be BMP (Bit Mapped), GIF (Graphics Interchange Format), TIF (Tagged Image File), or JPG (Joint Photographic Experts Group).

The output interface 226 is used for providing the second digital signal $D_2$ to output the second sensed data array to the central processing unit 270.

Besides, the communication interface 227 is used for outputting an interrupt request to the central processing unit 270, so that the central processing unit 270 can fetch the second sensed data array correctly via the second digital signal $D_2$.

In conclusion, the touch module outputting sensed data array of the present invention has the following advantages:
1. It can get rid of program memory.
2. It can reduce the space requirement of data memory.
3. It can use a simple state machine to execute the functions of the touch module.
4. It can reduce manufacture cost.
5. It can transfer the calculations of touch coordinates and gesture codes from the touch module to an external central processing unit, to make use of the powerful capability of the central processing unit, and in the meantime simplify the architecture of the touch module.

6. It can detect touch locations more efficiently, and reduce operation power consumption.

7. It is especially suitable for large size touch applications.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch module outputting sensed data array, said touch module comprising:
   a sensor array; and
   a sensed data array generator, comprising:
   a multiplexer, used to select one line from a plurality of scan output lines of said sensor array for delivering an analog sensed output signal, wherein said analog sensed output signal carries sensed array information of said sensor array;
   an analog to digital converter, used for converting said analog sensed output signal to a first digital signal, to provide a first sensed data array corresponding to said sensed array information;
   a memory, used for storing said first sensed data array via said first digital signal; and
   an output control unit, used for performing a coding operation on said first sensed data array to generate a second sensed data array, and outputting said second sensed data array via a second digital signal,
   wherein said sensor array is one selected from the group consisting of patterned copper foil sensor array, resistive sensor array, capacitive sensor array, force sensor array, electromagnetic sensor array, infrared sensor array, microwave sensor array, and acoustic wave sensor array.

2. A touch module outputting sensed data array, said touch module comprising:
   a sensor array; and
   a sensed data array generator, comprising:
   a multiplexer, used to select one line from a plurality of scan output lines of said sensor array for delivering an analog sensed output signal, wherein said analog sensed output signal carries sensed array information of said sensor array;
   an analog to digital converter, used for converting said analog sensed output signal to a first digital signal, to provide a first sensed data array corresponding to said sensed array information;
   a memory, used for storing said first sensed data array via said first digital signal; and
   an output control unit, used for performing a coding operation on said first sensed data array to generate a second sensed data array, and outputting said second sensed data array via a second digital signal,
   wherein said output control unit has an output interface for outputting said second digital signal, and
   wherein said output control unit further comprises an encoder for executing said coding operation.

3. The touch module outputting sensed data array as claim 2, wherein said coding operation includes a data allocation.

4. The touch module outputting sensed data array as claim 3, wherein said coding operation further includes a process of setting a data transmission format.

5. The touch module outputting sensed data array as claim 4, wherein said data transmission format is one selected from the group consisting of line oriented data format, plane oriented data format, universal communication protocol based data formats, standard image data formats, and custom-made data formats.

6. The touch module outputting sensed data array as claim 5, wherein said output control unit further comprises a communication interface for outputting an interrupt request to a central processing unit.

7. A touch module outputting sensed data array, said touch module comprising:
   a sensor array; and
   a sensed data array generator, comprising:
   a multiplexer, used to select one line from a plurality of scan output lines of said sensor array for delivering an analog sensed output signal, wherein said analog sensed output signal carries sensed array information of said sensor array;
   an analog to digital converter, used for converting said analog sensed output signal to a first digital signal, to provide a first sensed data array corresponding to said sensed array information;
   a memory, used for storing said first sensed data array via said first digital signal;
   a variable matrix scan control unit for controlling said multiplexer, said analog to digital converter, and said memory, wherein said variable matrix scan control unit has a standby mode and a variable matrix scan mode; and
   an output control unit, used for performing a coding operation on said first sensed data array to generate a second sensed data array, and outputting said second sensed data array via a second digital signal.

8. The touch module outputting sensed data array as claim 7, wherein said sensor array is one selected from the group consisting of patterned copper foil sensor array, resistive sensor array, capacitive sensor array, force sensor array, electromagnetic sensor array, infrared sensor array, microwave sensor array, and acoustic wave sensor array.

9. The touch module outputting sensed data array as claim 7, wherein said output control unit has an output interface for outputting said second digital signal.

10. The touch module outputting sensed data array as claim 9, wherein said output control unit further comprises an encoder for executing said coding operation.

11. The touch module outputting sensed data array as claim 10, wherein said coding operation includes a data allocation.

12. The touch module outputting sensed data array as claim 11, wherein said coding operation further includes a process of setting a data transmission format.

13. The touch module outputting sensed data array as claim 12, wherein said data transmission format is one selected from the group consisting of line oriented data format, plane oriented data format, universal communication protocol based data formats, standard image data formats, and custom-made data formats.

14. The touch module outputting sensed data array as claim 13 wherein said output control unit further comprises a communication interface for outputting an interrupt request to a central processing unit.

* * * * *